(12) United States Patent
Lee et al.

(10) Patent No.: US 8,480,101 B2
(45) Date of Patent: Jul. 9, 2013

(54) ANTI-ROLL SYSTEM FOR VEHICLES

(75) Inventors: Un Koo Lee, Seoul (KR); Sung Bae Jang, Suwon-si (KR); Daesik Ko, Hwaseong-si (KR); Jong Min Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/561,316

(22) Filed: Jul. 30, 2012

(65) Prior Publication Data
US 2013/0147144 A1    Jun. 13, 2013

(30) Foreign Application Priority Data
Dec. 9, 2011  (KR) ........................ 10-2011-0132227

(51) Int. Cl.
*B60G 21/055*    (2006.01)
(52) U.S. Cl.
USPC ............................. 280/124.107; 280/124.106
(58) Field of Classification Search
USPC ................................... 280/124.106, 124.107
See application file for complete search history.

(56) References Cited

U.S. PATENT DOCUMENTS

| | | | |
|---|---|---|---|
| 5,505,479 A * | 4/1996 | Lee | 280/124.107 |
| 7,077,407 B2 * | 7/2006 | Shin | 280/124.107 |
| 7,959,168 B2 * | 6/2011 | Kiselis et al. | 280/124.106 |
| 2008/0203694 A1 | 8/2008 | Gartner et al. | |

FOREIGN PATENT DOCUMENTS

| | | |
|---|---|---|
| JP | 9-2043 A | 1/1997 |
| JP | 2010-125960 A | 6/2010 |
| KR | 10-2008-0017573 A | 2/2008 |

* cited by examiner

*Primary Examiner* — Ruth Ilan
(74) *Attorney, Agent, or Firm* — Morgan, Lewis & Bockius LLP

(57) ABSTRACT

An anti-roll device for a vehicle may include a lower arm disposed at both sides of a sub-frame, a rotation mounter formed at a middle portion of the sub-frame, a spring unit of which the middle portion is rotatably disposed at the rotation mounter, and a push rod connected to both sides of the spring unit and the lower arm, wherein the spring unit includes a plate spring of which both end portions are bent in opposite directions, an engagement portion having an engagement hole in the middle portion thereof is formed, and a bolt hole is formed at both ends thereof, an assistant spring that is disposed at both sides of the engagement portion and an assemble hole is formed in the middle portion corresponding to the engagement hole, and an engagement yoke engaged with the plate spring and the assistant spring and disposed on the rotation mounter.

10 Claims, 6 Drawing Sheets

(S1)

(S2)

ANTI-ROLL SYSTEM FOR VEHICLES

CROSS-REFERENCE TO RELATED APPLICATION

The present application claims priority to Korean Patent Application No. 10-2011-0132227 filed in the Korean Intellectual Property Office on Dec. 9, 2011, the entire contents of which is incorporated herein for all purposes by this reference.

BACKGROUND OF THE INVENTION

1. Field of the Invention

The present invention relates to an anti-roll device for a vehicle. More particularly, the present invention relates to an anti-roll device for a vehicle (Anti-Roll System) that uses a streamlined plate spring and an assistant spring to improve turning stability of a vehicle and to non-linearly increase roll rigidity depending on the size of a lateral load that is input.

2. Description of Related Art

Generally, a suspension system of a vehicle connects an axle with a vehicle body, and prevents vibration or impact that is transferred from the road from being transferred to the vehicle body while driving to enhance ride comfort.

The suspension system is to flexibly absorb the movement such as up/down vibration (bounce), rolling, pitching, and yawing of a vehicle body that are generated while driving a vehicle.

Particularly, the rolling adversely affects the safety while the vehicle turns, and a stabilizer bar is applied to reduce the side effect of the rolling in a conventional art.

However, a conventional stabilizer bar generates friction with a mounting bush that is mounted in a vehicle body to cause ride discomfort, and the roll rigidity of the stabilizer bar is uniform regardless of the size of a lateral load (i.e., roll angle), and therefore the stability of the vehicle cannot be guaranteed, Also, there is a drawback that lubrication of rubber of a mounting bush is transformed or worn out to generate noise.

As shown in FIG. 1, an anti-roll device using a plate spring has been developed so as to resolve the problem of a conventional stabilizer bar.

Referring to FIG. 1, the anti-roll device has a lower arm 103 that is disposed at both sides of a sub-frame 101 and a rotating mounter 105 that is disposed at a middle portion of the sub-frame 101.

A spring unit having a plate spring 107 is rotatably disposed at a middle portion of the rotation mounter 105.

Respective ends of the plate spring 107 are connected to lower arms through a pushrod 109.

That is, the anti-roll device is designed to use elastic force of the plate spring 107 to reduce roll of a vehicle, while not generating interference with a suspension system, and varies roll rigidity in proportion to a lateral load to effectively reduce the roll of the vehicle.

However, in a conventional anti-roll device for a vehicle as described above, the front/rear length of the plate spring 107 is long to generate interference with a vehicle body (e.g., TW: tire wall) or an adjacent component (e.g., TK; fuel tank) and there is a drawback in a layout aspect.

Also, because the entire length of the plate spring 107 cannot be increased because of the layout, it is disadvantageous in terms of energy absorption capacity, and because a load input angle that is transferred from a tire (T) and the push rod 109 is large, there is a drawback that load transferring efficiency is low.

Also, there is a drawback that a bracket (B) for engaging the push rod 109 with the plate spring 107 needs to be prepared for an assemble angle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an anti-roll device for a vehicle having advantages of using a streamlines plate spring and an assistant spring to suppress a large amount of roll of a vehicle and increase roll rigidity along with the size of a lateral load that is input to improve driving/turning stability of a vehicle.

Also, Various aspects of the present invention are directed to providing an anti-roll device for a vehicle having advantages of applying a streamlined plate spring such that the energy absorption capacity is improved, the length of a front/rear direction thereof is reduced to eliminate interference, there is a merit in a layout aspect, and a load input angle with a pushrod is reduced to improve load transferring efficiency.

Further, Various aspects of the present invention are directed to providing an anti-roll device for a vehicle having advantages of directly engaging a pushrod with a plate spring such that the number of engagement components is reduced to be simple.

In an aspect of the present invention, an anti-roll device for a vehicle may include a lower arm that is disposed at both sides of a sub-frame, a rotation mounter that is formed at a middle portion of the sub-frame, a spring unit of which a middle portion thereof is rotatably disposed at the rotation mounter, and a push rod that is connected to both ends of the spring unit and the lower arm, wherein the spring unit may include a plate spring having an engagement portion including an engagement hole in a middle portion thereof, wherein both end portions of the engagement portion are bent in opposite directions toward the middle portion of the engagement portion along each of both lateral sides of the plate spring to may have a streamlined shape and a bolt hole is formed at both ends of the both end portions, an assistant spring that is disposed at the both lateral sides of the engagement portion and an assemble hole is formed in a middle portion thereof corresponding to the engagement hole, and an engagement yoke of which an upper portion thereof is engaged with the plate spring and the assistant spring through the engagement hole and the assemble hole via a bolt and a lower portion thereof is rotatably disposed on the rotation mounter.

The plate spring is connected to the push rod through a ball joint that is engaged with the bolt hole of the plate spring.

The plate spring is bent to form an "S" shape, wherein the plate spring is connected to the push rod through a ball joint that is engaged with the bolt hole of the plate spring.

The assistant spring is shorter than the plate spring.

The assistant spring is a plane plate spring that respectively contacts each of the both lateral sides in the middle portion of the plate spring, wherein two assistant springs forms one set, wherein the assistant spring is shorter than the plate spring.

The engagement yoke has a fork portion that is formed at an upper side thereof, and the plate spring and the assistant spring are received in the fork portion and fixed thereto via the bolt, and a bolt portion that is formed at a lower side thereof and is rotatably disposed on the rotation mounter.

The lower arm is connected to the other end of the push rod through a control link that is disposed to penetrate an end portion of the sub-frame.

The rotation mounter may include a bearing housing that is fixed on the middle portion of the sub-frame, and a bearing that is inserted into the bearing housing in a state that a bolt portion that is formed at a lower side of the engagement yoke is inserted into an inner race of the bearing.

An exemplary embodiment of the present invention uses the "S" type streamlined plate spring and an assistant spring such that roll rigidity is non-linearly increased depending on the size of a lateral load that is input and suppresses a roll of a vehicle against a large amount of roll to secure turning and driving stability.

Further, a streamlined plate spring is applied to improve energy absorption capacity and to reduce the length of a front/rear direction thereof such that interference between components is eliminated and there is a merit in a layout aspect.

A load input angle that is transferred from a push rod and a tire is reduced to improve load transferring efficiency, and a push rod and a plate spring are directly engaged to reduce the number of engagement components to be simple.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
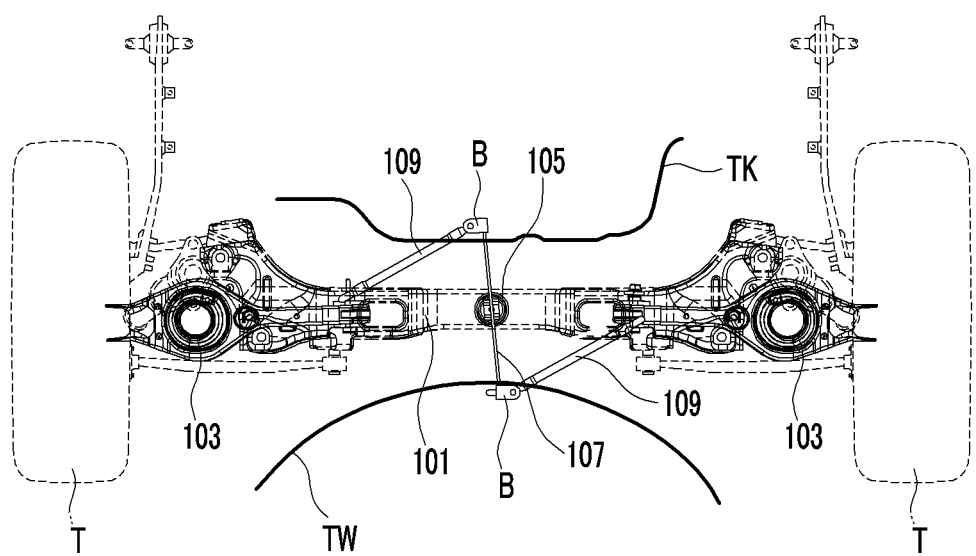
FIG. 1 is a perspective view of an anti-roll device for a vehicle according to a conventional art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings.

However, parts that are not related thereto will be omitted so as to clearly describe an exemplary embodiment of the present invention.

Figure 2:
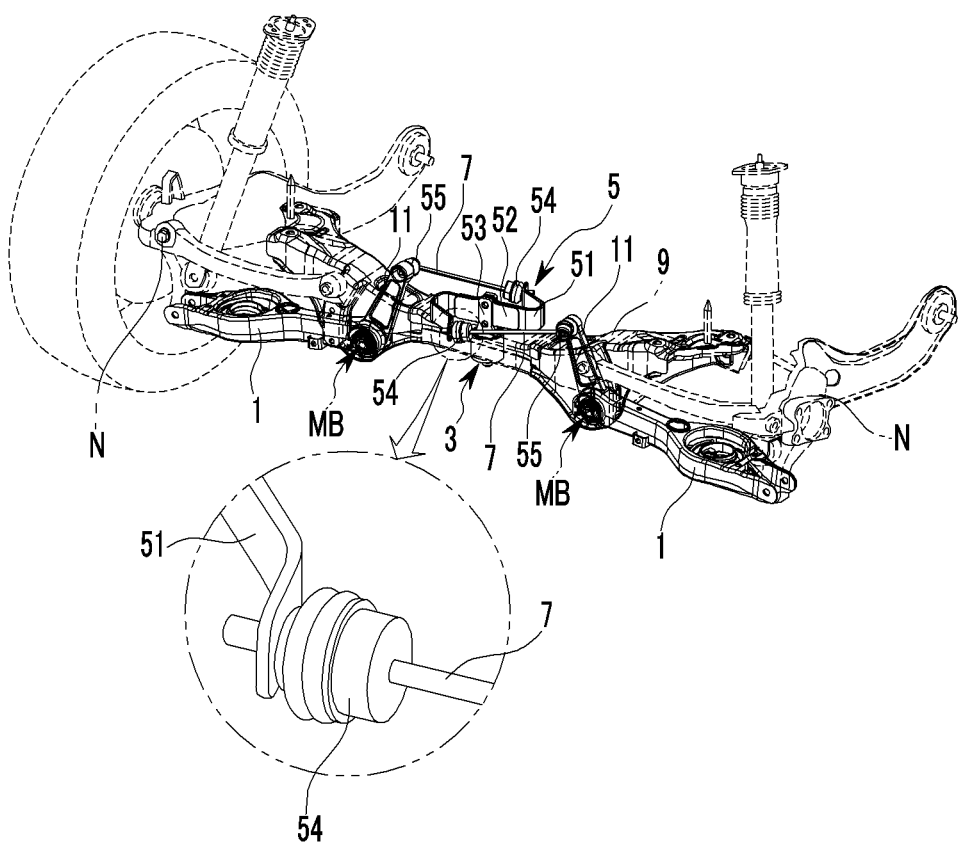
FIG. 2 is a perspective view of an anti-roll device for a vehicle according to an exemplary embodiment of the present invention.
Figure 3:
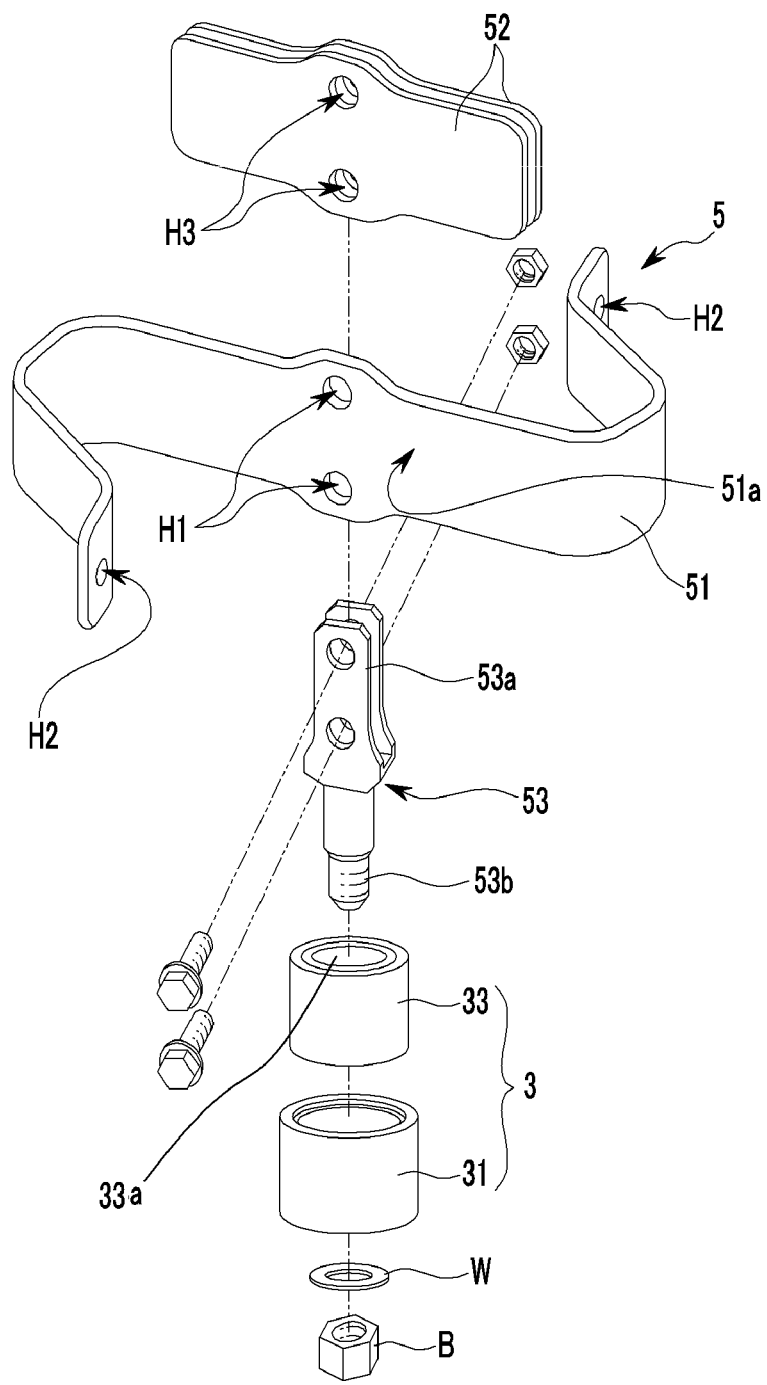
FIG. 3 is an exploded perspective view of a spring unit and a rotation mounter that is applied to an anti-roll device for a vehicle according to an exemplary embodiment of the present invention.

FIG. 2 is a perspective view of an anti-roll device for a vehicle according to an exemplary embodiment of the present invention, and FIG. 3 is an exploded perspective view of a spring unit and a rotation mounter that is applied to an anti-roll device for a vehicle according to an exemplary embodiment of the present invention.

Referring to FIG. 2, an anti-roll device for a vehicle according to an exemplary embodiment of the present invention non-linearly increases roll rigidity depending on a lateral load that is transferred to a vehicle body and flexibly suppresses a roll of a vehicle against a large amount of roll to improve driving and turning stability of a vehicle.

The anti-roll device for a vehicle includes a lower arm 1, a rotation mounter 3, a spring unit 5, and a pushrod 7.

The lower arm 1 is disposed at both sides of the sub-frame 9 through a mounting bush (MB) to be connected to one side of a knuckle (N).

The lower arm 1 is integrally formed with a control link 11 that is disposed to penetrate an end portion of the sub-frame 9, and has a mounting bush (MB) formed together with a sub-frame 9.

Further, as shown in FIG. 3, the rotation mounter 3 is fixed at an inner side of a middle portion of the sub-frame 9.

The rotation mounter 3 has a bearing housing 31 that is fixed at the middle inside of the sub-frame 9, and a bearing 33 is forcibly inserted into the bearing housing 31.

Further, the middle portion of the spring unit 5 is rotatably disposed on the rotation mounter 3.

Referring to FIG. 3, the spring unit 5 includes a streamlined plate spring 51, an assistant spring 52, and an engagement yoke 53.

Both sides of the plate spring 51 are bent in opposite directions based on the middle portion thereof. Also, an engagement portion 51a having an engagement hole H1 is formed at the middle portion, and a bolt hole H2 is formed at both ends thereof.

Here, the plate spring 51 is bent along an "S" shape to be streamlined.

Also, the plate spring 51 is engaged with a ball joint 54 that is disposed at one end of the push rod 7 through the bolt hole H2 thereof.

The assistant spring 52 is respectively disposed on both side of the engagement portion 51a of the plate spring 51, and an assembly hole H3 is formed at the middle portion of the assistant spring 52 corresponding to the engagement hole H1.

The assistant spring 52 is a plane plate spring that contacts both side surfaces of the engagement portion 51a that is formed in the middle portion of the plate spring 51, and two springs 52 forms one set.

Also, the length of the assistant spring 52 is shorter than that of the plate spring 51.

The assistant spring 52 is disposed at both side surfaces of the engagement portion 51a of the plate spring 51 in an exemplary embodiment of the present invention, but it is not limited thereto, and four springs 52 can be applied thereon so as to increase the overall rigidity of the spring unit 5, and more springs can be applied if necessary.

Also, an upper portion of the engagement yoke 53 is engaged with the plate spring 51 and the assistant spring 52 through a bolt, and a lower portion thereof is disposed on the bearing 33 of the rotation mounter 3.

That is, the engagement yoke 53 has a fork portion 53a that is formed at an upper side and a bolt portion 53b that is formed at a lower side.

The assistant spring 52 is disposed at both sides of the engagement portion 51a of the plate spring 51, and the springs 52 and 51 are engaged on the fork portion 53a through a bolt.

Further, a bolt portion 53b that is formed at a lower side of the engagement yoke 53 is engaged with the bearing 33 of the rotation mounter 3, and the bolt portion 53b is inserted into an inner race 33a of the bearing 33 to be fixed by a nut (B) together with a washer (W).

The pushrod 7 connects both end portions of the streamlined plate spring 51 with end portions of the control links 11 that are respectively connected to a lower arm 1.

One end of the pushrod 7 is connected to an end portion of the plate spring 51 through a ball joint 54, and the other end thereof is connected to an end portion of a connecting rod 11 of the lower arm 1 through a ball joint 55.

Figure 4:
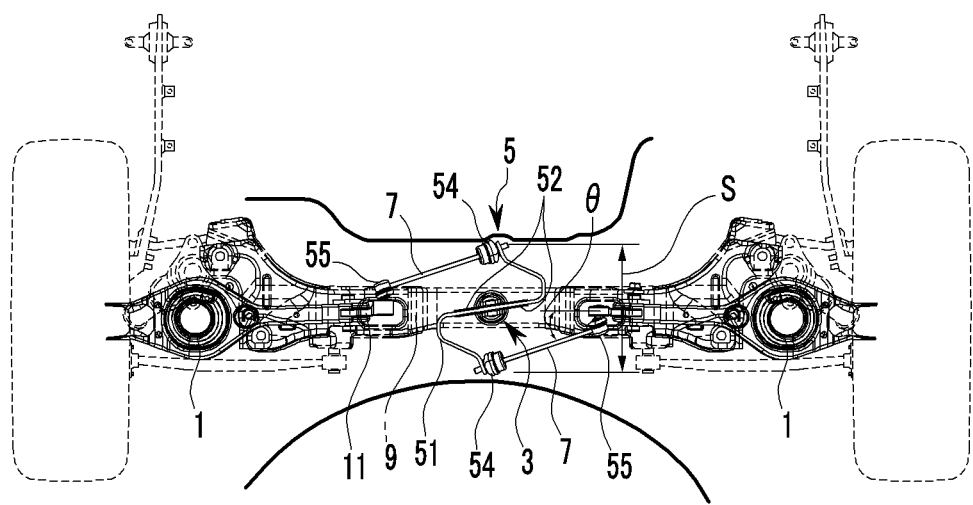
FIG. 4 is a top plan view of an anti-roll device for a vehicle according to an exemplary embodiment of the present invention.

As shown in FIG. 4, an anti-roll device for a vehicle as described above uses the streamlined plate spring 51 such that the entire length is increased, energy absorption capacity is increased, a span (S) of a front/rear direction is reduced, interference between surrounding components is prevented, and there is a merit in a layout aspect.

Also, a load input angle (0) that is transferred from the pushrod 7 and the tire is decreased to improve load transferring efficiency, and the pushrod 7 is directly engaged with the plate spring 51 through the ball joint 54 to reduce the number of engagement components.

Hereinafter, referring to FIG. 5 and FIG. 6, operations of an anti-roll device for a vehicle will be described.

Figure 5:
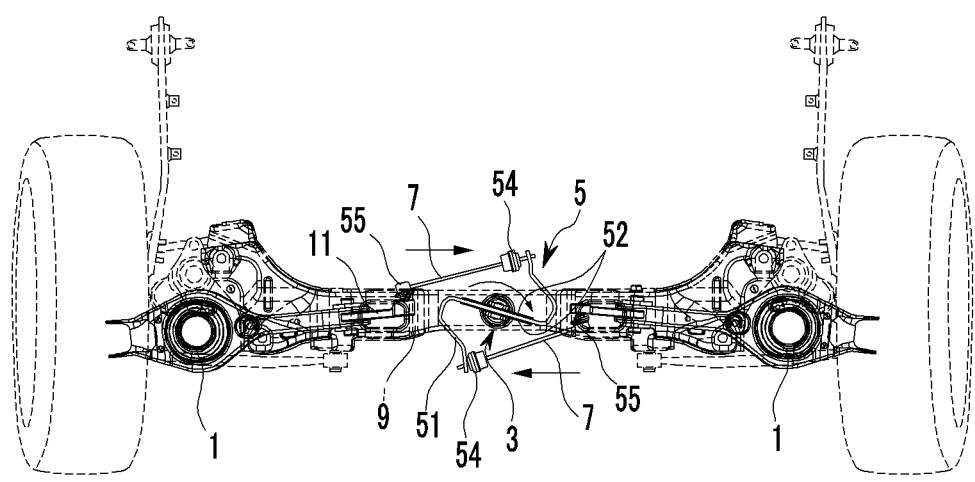
FIG. 5 shows an operational state of an anti-roll device for a vehicle according to an exemplary embodiment of the present invention.
Figure 5:
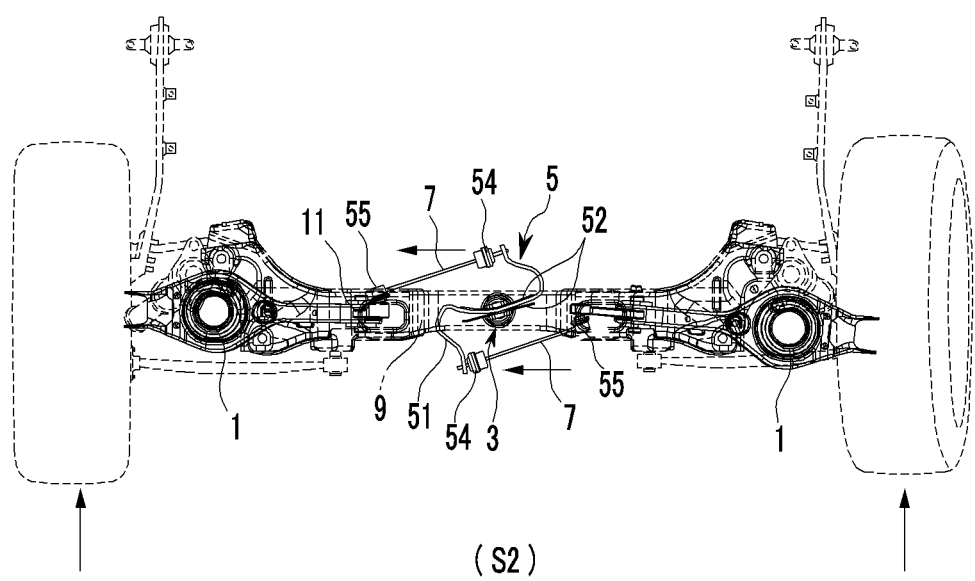

That is, as shown in "S1" of FIG. 5, when a vehicle body hits a bump equally on both sides, connecting rods 11 of both sides push the push rod 7 in an inner direction of the vehicle body.

Then, the streamlined plate spring 51 that is mounted on the rotation mounter 3 through the engagement yoke 53 is rotated in a clockwise direction together with the assistant spring 52 to absorb the bumping force.

When the vehicle body rebounds in the same condition, the connecting rods 11 of both sides draw each end portion of the pushrod 7, and the plate spring 51 that is mounted on the rotating mounter 3 through the engagement yoke 53 is rotated in an anticlockwise direction together with the assistant spring 52 to absorb the rebounding force.

As shown in "S2" of FIG. 5, when a vehicle body is operated with an inverse condition, the connecting rod 11 that is disposed on a bumping side pushes the pushrod 7 in an inner side direction and the connecting rod 11 that is disposed on a rebounding side draws the pushrod 7.

Then, pushrods 7 of both sides move in a direction in which the rebounding is performed such that both ends of the plate spring 51 are pushed or drawn to bend the plate spring 51.

Thereby, the plate spring 51 suppresses the roll of the vehicle body by elastic force thereof.

The bend amount of the plate spring 51 is increased while the lateral load that is input to the plate spring 51 is increased, and if the bend amount of the plate spring 51 is larger than a predetermined value, the assistant spring 52 supports the plate spring 51 to reinforce the roll rigidity of the vehicle body.

Figure 6:
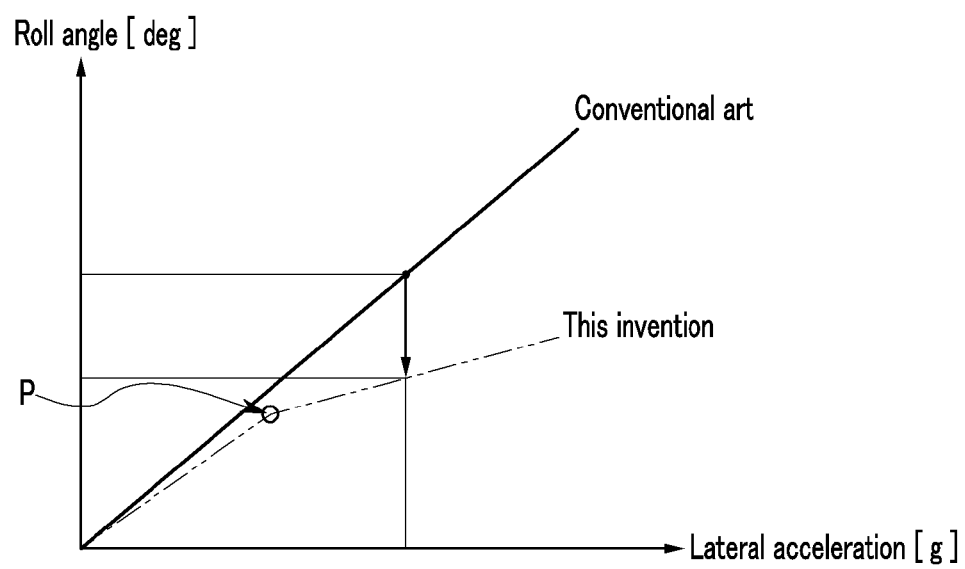
FIG. 6 shows a performance curve of an anti-roll device for a vehicle according to an exemplary embodiment of the present invention and a conventional art.

That is, as shown in FIG. 6, an anti-roll device for a vehicle according to an exemplary embodiment of the present invention non-linearly increases roll rigidity from a point "P" while a roll angle is increased such that a roll of a vehicle is suppressed and driving and turning stability is improved.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An anti-roll device for a vehicle that includes lower arms that are disposed at respective ones of both sides of a sub-frame, a rotation mounter that is formed at a middle portion of the sub-frame, a spring unit of which a middle portion thereof is rotatably disposed at the rotation mounter, and push rods that are connected to respective ones of both ends of the spring unit and respective ones of the lower arms, wherein the spring unit includes:
a plate spring having an engagement portion including an engagement hole in a middle portion thereof, wherein both end portions of the engagement portion are bent in opposite directions toward the middle portion of the engagement portion along each of both lateral sides of the plate spring to have a streamlined shape and a bolt hole is formed at both ends of the both end portions;
an assistant spring that is disposed at the both lateral sides of the engagement portion and an assemble hole is formed in a middle portion thereof corresponding to the engagement hole; and
an engagement yoke of which an upper portion thereof is engaged with the plate spring and the assistant spring through the engagement hole and the assemble hole via a bolt and a lower portion thereof is rotatably disposed on the rotation mounter.

2. The anti-roll device for the vehicle of claim 1, wherein the plate spring is connected to each push rod through a ball joint that is engaged with the bolt hole of the plate spring.

3. The anti-roll device for the vehicle of claim 1, wherein the plate spring is bent to form an "S" shape.

4. The anti-roll device for the vehicle of claim 3, wherein the plate spring is connected to each push rod through a ball joint that is engaged with the bolt hole of the plate spring.

5. The anti-roll device for the vehicle of claim 1, wherein the assistant spring is shorter than the plate spring.

6. The anti-roll device for the vehicle of claim 1, wherein the assistant spring is a plane plate spring that respectively contacts each of the both lateral sides in the middle portion of the plate spring, wherein two assistant springs forms one set.

7. The anti-roll device for the vehicle of claim 6, wherein the assistant spring is shorter than the plate spring.

8. The anti-roll device for the vehicle of claim 1, wherein the engagement yoke has:
   a fork portion that is formed at an upper side thereof, and the plate spring and the assistant spring are received in the fork portion and fixed thereto via the bolt; and
   a bolt portion that is formed at a lower side thereof and is rotatably disposed on the rotation mounter.

9. The anti-roll device for the vehicle of claim 1, wherein each lower arm is connected to the other end of the push rod through a control link that is disposed to penetrate an end portion of the sub-frame.

10. The anti-roll device for the vehicle of claim 1, wherein the rotation mounter includes:
    a bearing housing that is fixed on the middle portion of the sub-frame; and
    a bearing that is inserted into the bearing housing in a state that a bolt portion that is formed at a lower side of the engagement yoke is inserted into an inner race of the bearing.

\* \* \* \* \*